(12) United States Patent
Chan et al.

(10) Patent No.: US 6,621,612 B2
(45) Date of Patent: Sep. 16, 2003

(54) FULL SPECTRUM OPTICAL COMMUNICATION SYSTEM AND METHODS THEREOF

(75) Inventors: Wee Piak Chan, Singapore (SG); Jing Hua Tian, Singapore (SG); Kay Ping Poh, Singapore (SG)

(73) Assignee: Teradata Technologies Limited, Singapore (SG)

( * ) Notice: Subject to any disclaimer, the term of this patent is extended or adjusted under 35 U.S.C. 154(b) by 0 days.

(21) Appl. No.: 09/811,983

(22) Filed: Mar. 19, 2001

(65) Prior Publication Data

US 2002/0167710 A1 Nov. 14, 2002

(51) Int. Cl.[7] .................. G02B 26/00; G02B 3/00; H04J 14/00; H04J 14/10
(52) U.S. Cl. .................. 359/239; 359/722; 359/117; 359/129
(58) Field of Search .................. 359/132, 181, 359/239, 117, 129, 722, 640; 356/302, 310, 308; 250/227.21, 227.23

(56) References Cited

U.S. PATENT DOCUMENTS

| | | | | | |
|---|---|---|---|---|---|
| 3,640,625 | A | * | 2/1972 | Ibbett et al. ............... | 356/310 |
| 4,015,130 | A | * | 3/1977 | Landry et al. ............... | 250/372 |
| 4,448,529 | A | * | 5/1984 | Krause ........................ | 356/310 |
| 4,615,619 | A | * | 10/1986 | Fateley ....................... | 356/310 |
| 5,146,358 | A | * | 9/1992 | Brooks ........................ | 359/181 |
| 5,729,369 | A | | 3/1998 | Zirngibl ...................... | 359/110 |
| 2002/0167710 | A1 | * | 11/2002 | Chan et al. ................. | 359/238 |

* cited by examiner

Primary Examiner—David N. Spector
(74) Attorney, Agent, or Firm—Conley Rose, P.C.

(57) ABSTRACT

An optical communication system (10), a method (100) for parallel modulation of an optical spectrum and a method (200) for parallel demodulation of the optical spectrum of modulated optical frequencies by the system (10) are described. The optical frequencies are provided in parallel to a modulation section (14) for modulating with data bits from a data signal source (16). The data bits are associated with an optical modulator (58) that controls passage of the optical spectrum at a plurality of predetermined optical frequencies based upon the data bits. The optical frequencies of the optical spectrum, modulated by the data bits, are then transmitted via a communication section (18) to an optical receiver (20) that is coupled to a demodulation section (22) of the system (10). Modulated optical frequencies are received as a modulated optical spectrum and demodulated in parallel by an optical demodulator (92) to derive the data bits.

12 Claims, 4 Drawing Sheets

FULL SPECTRUM OPTICAL COMMUNICATION SYSTEM AND METHODS THEREOF

FIELD OF THE INVENTION

This invention relates to optical communication systems. In particular, this invention relates to modulation, demodulation, transmission and reception of information in an optical communication system using an optical spectrum that includes the visible and invisible spectrum ranging from infrared to the ultraviolet light frequencies.

BACKGROUND

Existing optical communication systems modulate input signals onto light from a light source prior to transmission. For such optical communication systems, the light source typically provides coherent light that is narrowband and centred at a specific frequency.

To increase the capacity of information transmission in existing optical communication systems, a technique known as wavelength division multiplexing (WDM) is applied. In WDM, data is transmitted simultaneously on optical carrier signals at different wavelengths to increase transmission capacity. Thus, the transmission capacity of a WDM optical communication system is increased by a factor that is equal to the number of different wavelengths used.

However, WDM and other existing techniques such as time division multiplexing (TDM) to increase transmission capacity are still limited because each wavelength is modulated separately from the other wavelengths. Any unused capacity in one wavelength cannot be used to compensate overloading in another wavelength. Furthermore, the different wavelengths have to be provided by separate coherent light sources. For example, U.S. Pat. No. 5,729,369, issued to Zirngibl on Mar. 17, 1998 and assigned to Lucent Technologies Inc., describes the use of a multifrequency light source constructed of a plurality of distributed feedback lasers. Simplifying or eliminating the separate coherent light sources can therefore reduce complexity and costs of existing optical communication systems.

Therefore, a need clearly exists for an optical communication system that vastly improves transmission capacity.

SUMMARY

In accordance with one aspect of the invention, there is disclosed a method for parallel modulation of an optical spectrum, the method comprising the steps of:
  receiving the optical spectrum by at least one optical modulator, the at least one optical modulator being arranged in association with optical frequencies of the optical spectrum and coupled to at least one data signal source; and
  simultaneously modulating, by the at least one optical modulator, a plurality of predetermined optical frequencies of the optical spectrum with a plurality of data bits provided by the at least one data signal source, each of the plurality of data bits being respectively coupled to the at least one optical modulator for parallel modulation of the plurality of data bits.

Optionally, the modulating step can comprise the step of amplitude modulating the plurality of predetermined optical frequencies.

Generally, the method can further comprise the step of synchronising operation of the at least one optical modulator with a spectrum controller for controlling the optical spectrum.

More generally, the method can further comprise the step of gating the optical spectrum at a predetermined frequency.

Alternatively, the method can further comprise the step of regulating the optical spectrum as pulses, each of the pulses having a predetermined period.

In accordance with another aspect of the invention, there is disclosed a method for parallel demodulation of an optical spectrum of modulated optical frequencies, the method comprising the steps of:
  receiving the optical spectrum by at least one optical demodulator, the at least one optical demodulator being arranged in association with the modulated optical frequencies; and
  simultaneously demodulating the optical spectrum, by the at least one optical demodulator, at a plurality of predetermined optical frequencies of the modulated optical frequencies to thereby derive a plurality of data bits, the plurality of predetermined optical frequencies being respectively demodulated in parallel by the at least one optical demodulator.

Generally, the demodulating step can comprise the step of detecting the optical spectrum at the plurality of predetermined optical frequencies.

Optionally, the detecting step can comprise the step of determining the amplitude of the optical spectrum at the plurality of predetermined optical frequencies.

In accordance with yet another aspect of the invention, there is disclosed an optical communication system for parallel modulation of an optical spectrum, the optical communication system comprising:
  means for simultaneously modulating a plurality of predetermined optical frequencies of the spectrum with a plurality of data bits provided by at least one data signal source, the plurality of data bits being coupled to the modulating means for parallel modulation of the plurality of data bits.

Generally, the modulating means can comprise at least one optical modulator for controlling passage of the plurality of predetermined optical frequencies.

More generally, each of the plurality of data bits can be respectively coupled to each of the at least one optical modulator.

Optionally, each of the at least one optical modulator can comprise an optical switch.

Alternatively, each of the at least one optical modulator can comprise an optical shutter.

Generally, the optical communication system can further comprise means for synchronising operation of the modulating means with means for controlling the optical spectrum.

More generally, the controlling means can comprise means for gating the optical spectrum at a predetermined frequency.

Alternatively, the controlling means can comprise means for regulating the optical spectrum as pulses, each of the pulses having a predetermined period.

In accordance with a further aspect of the invention, there is disclosed an optical communication system for parallel demodulation of an optical spectrum of modulated optical frequencies, the optical communication system comprising:
  means for simultaneously demodulating the optical spectrum at a plurality of predetermined optical frequencies of the modulated optical frequencies to thereby derive a plurality of data bits, the plurality of data bits being respectively demodulated in parallel by the demodulating means.

Generally, the demodulating means can comprise at least one optical demodulator, the at least one optical demodulator being arranged in association with the modulated optical frequencies.

Optionally, each of the at least one optical demodulator can comprise an optical amplitude demodulator.

Alternatively, each of the at least one optical demodulator can comprise an optical detector.

In accordance with a further aspect of the invention, there is provided an optical communication system for parallel modulation and demodulation of an optical spectrum, said optical communication system comprising:

means for simultaneously modulating a plurality of predetermined optical frequencies of said spectrum with a plurality of data bits provided by at least one data signal source, said plurality of data bits being coupled to said modulating means for parallel modulation of said plurality of data bits;

means for simultaneously demodulating said optical spectrum at a plurality of predetermined optical frequencies of said modulated optical frequencies to thereby derive a plurality of data bits, said plurality of data bits being respectively demodulated in parallel by said demodulating means; and a communication medium.

BRIEF DESCRIPTION OF THE DRAWINGS

A preferred embodiment of the invention is described hereinafter with reference to the drawings, in which.

DETAILED DESCRIPTION

An optical communication system, a method for parallel modulation of an optical spectrum and a method for parallel demodulation of the optical spectrum of modulated optical frequencies by the optical communication system in accordance with a preferred embodiment of the invention are described. In the following description, numerous details are provided for a more thorough description. It shall be apparent to one skilled in the art, however, that the invention may be practised without such details. In other instances, well-known details have not been described at length so as not to obscure the invention.

The advantages of the preferred embodiment of the invention are manifold. One advantage of the preferred embodiment of the invention is that the full optical spectrum can be used for transmission and reception of a large data string. Using the full optical spectrum offers a substantial increase in data carrying capacity compared to existing WDM optical communication systems.

Another advantage of the preferred embodiment of the invention is that the parallel modulation method modulates different optical frequencies of the optical spectrum simultaneously. Likewise, the parallel demodulation method demodulates different modulated optical frequencies of a modulated optical spectrum simultaneously. Simultaneously modulating or demodulating such optical frequencies differs from existing optical communication systems in which one optical frequency is modulated or demodulated separately from another optical frequency.

Figure 1:
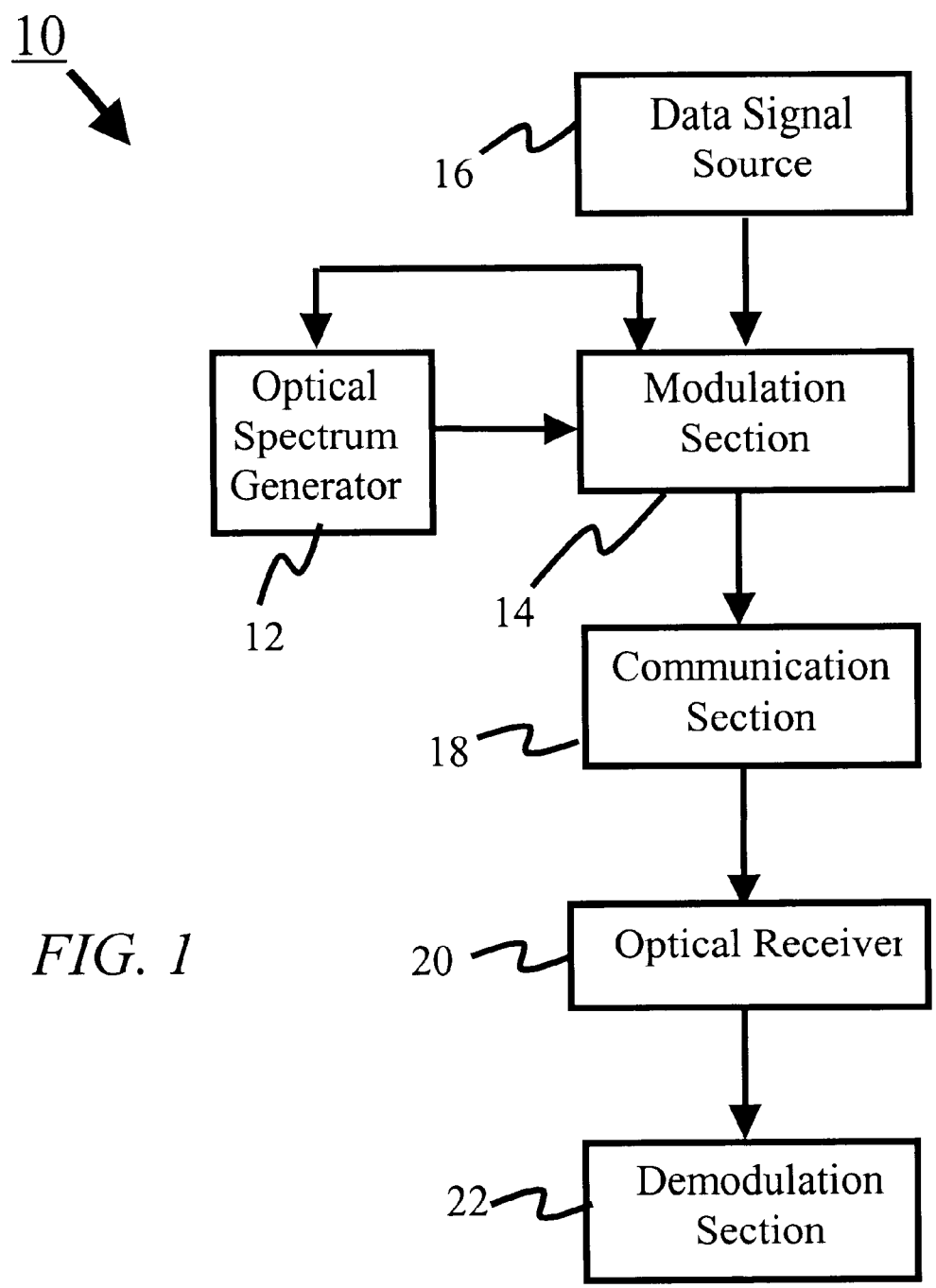
FIG. 1 is a general functional block diagram of an optical communication system in accordance with a preferred embodiment of the invention.

Referring now to FIG. 1, a general block diagram of an optical communication system 10 in accordance with a preferred embodiment of the invention is shown. The system 10 comprises an optical spectrum generator 12 and a modulation section 14. Further elements of the system 10 include a data signal source 16, a communication section 18, an optical receiver 20 and a demodulation section 22.

The modulation section 14 optically couples to the optical receiver 20 via the communication section 18 that may include optical amplifiers or communication resources such as optical fibers. The modulation section 14 also couples to the data signal source 16 that provides input data signals for modulating an optical spectrum generated from by the optical spectrum generator 12.

It is to be noted that the optical spectrum can include the entire range, or at least a part thereof, of visible and invisible optical frequencies ranging from infrared to ultraviolet light frequencies.

Figure 2:
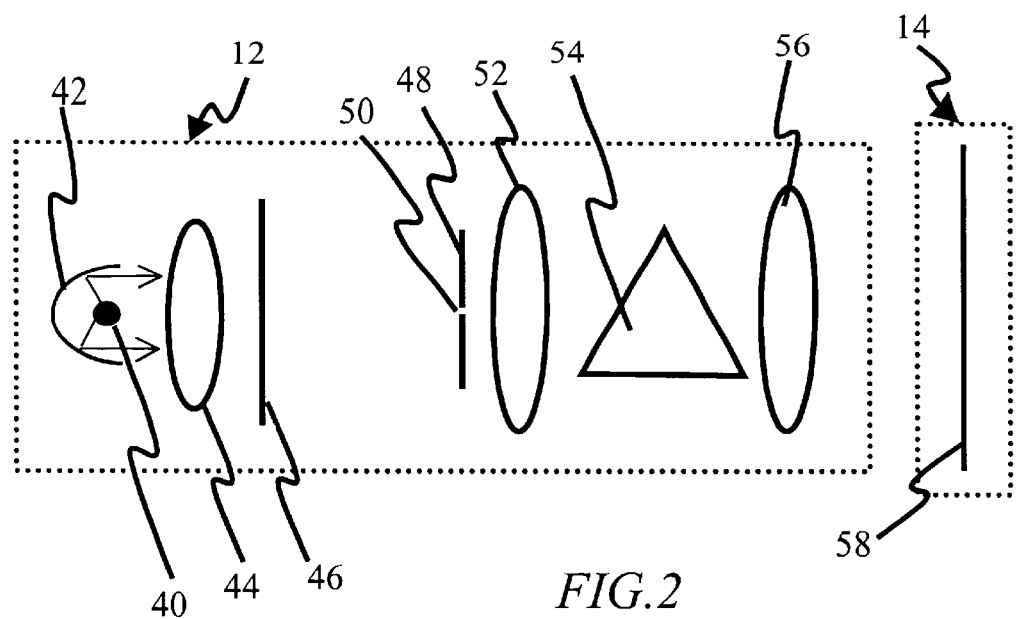
FIG. 2 illustrates an exemplary schematic layout of a part of the optical communication system of FIG. 1.

FIG. 2 illustrates an exemplary schematic layout of the optical spectrum generator 12 and the modulation section 14. The optical spectrum generator 12 comprises a light source 40, a reflector 42, a converging lens 44, a spectrum controller 46, a slot mount 48 having a slot 50, an objective lens 52, a prism 54 and a spectral lens 56. These elements of the optical spectrum generator 12 are organised in series. The modulation section 14 comprises at least one optical modulator 58. The optical modulator 58 can be, for example, an optical switch or an optical shutter.

An optical spectrum, generated by the optical spectrum generator 12 has optical frequencies. For illustrative purposes, five predetermined optical frequencies ($f_1$, $f_2$, $f_3$, $f_4$ and $f_5$) are used to describe operation of the system 10. These five optical frequencies are selected such that the wavelength of each is different and equally separated relative to each other. Hence, assuming $f_1$ is the lowest frequency, then:

$$[\lambda(f_1)-\lambda(f_2)]\approx[\lambda(f_2)-\lambda(f_3)]$$

Figure 3:
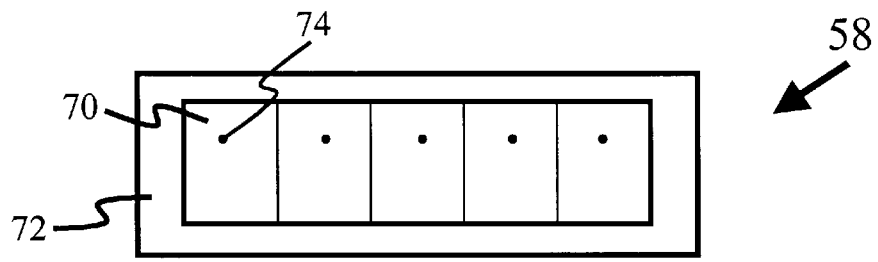
FIG. 3 illustrates an example of an optical modulator of the optical communication system of FIG. 1.

FIG. 3 illustrates an example of the layout of an optical modulator 58. The optical modulator 58 has, for this example, five optical switches 70 that are respectively associated with the five predetermined optical frequencies. The five optical switches 70 are mounted on a modulator mount 72. Each of these five optical switches 70 has, for example, an aperture 74 for passage of a respective wavelength of each of the five predetermined optical frequencies.

These wavelengths of the five predetermined optical frequencies are not separately generated but are inherent in the optical spectrum generated by the optical spectrum generator 12. For example, the light source 40 may be a source of white light that provides the optical spectrum. It is to be noted that infrared or ultraviolet wavelengths outside of the spectrum of visible light may also be used. The optical spectrum is derived from the light source 40. Output light from the light source 40 is reflected by the reflector 42 and directed towards the converging lens 44.

The converging lens 44 then converges the light towards the spectrum controller 46. Receiving the light at this stage, the slot 50 diverges the light towards the objective lens 52. The objective lens 52 then aligns spectral rays of the light in parallel relative to each other. Such parallel spectral rays are then diffracted by the prism 54 to provide the optical spectrum. Other diffracting means such as, for example, an optical grating may be used to diffract the parallel spectral rays in place of the prism 54.

After diffraction by the prism 54, the optical spectrum output is then directed, by the spectral lens 56, towards the optical modulator 58. The optical modulator 58 is optically coupled to the optical spectrum generator 12 to receive the optical spectrum accurately at the optical switches 70. This requires the optical switches 70 to be respectively disposed at positions associated with the five predetermined optical frequencies of the optical spectrum. Hence, passage of a wavelength corresponding to one of the five predetermined optical frequencies is controlled depending on whether the aperture 74 of an optical switch 70 associated with that predetermined optical frequency is open or closed. Henceforth, an aperture 74 that is set for the passage of a predetermined optical frequency is referred to as an optical switch 70 that is open or in an open position and an aperture 74 that is closed to the passage of a predetermined optical frequency is referred to as an optical switch 70 that is closed or in a closed position.

The optical switches 70 are, in turn, controlled by at least one data signal provided by the data signal source 16 (not shown in FIG. 2). The data signal source 16 electrically couples to the optical switches 70. Depending on data bits of a data signal, each of the optical switches 70 is set to an open position or a closed position to allow or to block the passage of each of the predetermined optical frequencies. Accordingly, the optical spectrum is modulated by a data signal to provide the data bits. Hence, a plurality of data signals provides sets of data bits.

For controlling the passage of each of the predetermined optical frequencies, the spectrum controller 46 is electrically and synchronously coupled to the optical modulator 58. The spectrum controller 46 may provide for gating of the optical spectrum at a predetermined frequency. Alternatively, a pulse controller (not shown in FIG. 2) may regulate the optical spectrum as pulses with each of these pulses having a predetermined period. Thus, the predetermined frequency of the gating or the predetermined period of each pulse of the optical spectrum is synchronised with opening or closing of the optical switches 70. The predetermined period of a pulse can be varied but this requires the opening and closing of the optical switches 70 to be also variable.

It is to be noted that faster gating or a higher predetermined frequency of the gating increases the data rate. Similarly, a shorter predetermined period for a pulse enables a higher data transmission rate than a longer beam pulse. The data transmission rate is also limited by response characteristics of the optical switches 70 in opening and closing.

Table 3 below shows examples of how different data signals, each having five data bits, are represented by status of the respective five optical switches 70. Table 3 indicates passage of a predetermined optical frequency through an open optical switch 70 as a bit '1' and blockage of a predetermined optical frequency by a closed optical switch 70 as indicative of a bit '0'. However, the optical switches 70 can also be electrically coupled to the data signal source such that a bit '0' sets an optical switch 70 in an open position and a bit '1' sets an optical switch 70 in a closed position.

TABLE 3

Different five-bit data signals and respective optical switch positions.

| | Optical Switch $f_1$ | Optical Switch $f_2$ | Optical Switch $f_3$ | Optical Switch $f_4$ | Optical Switch $f_5$ |
|---|---|---|---|---|---|
| Data bits | 1 | 1 | 1 | 1 | 1 |
| Optical switch position | Open | Open | Open | Open | Open |
| Data bits | 0 | 0 | 0 | 0 | 0 |
| Optical switch position | Close | Close | Close | Close | Close |
| Data bits | 1 | 0 | 1 | 0 | 1 |
| Optical switch position | Open | Close | Open | Close | Open |
| Data bits | 1 | 1 | 1 | 0 | 0 |
| Optical switch position | Open | Open | Open | Close | Close |
| Data bits | 0 | 0 | 0 | 1 | 1 |
| Optical switch position | Close | Close | Close | Open | Open |

Five different predetermined optical frequencies provide $2^5$ or 32 combinations of data bits. Increasing the number of predetermined optical frequencies by a factor of one increase the combinations of data bits by a factor of two.

By modulating the predetermined optical frequencies using the optical switches 70, the optical spectrum now carries information based upon the data signal. The optical spectrum, in the form of modulated optical frequencies, may then be provided to the communication section 18 for transmission. For such transmission, the communication section 18 may include an optical antenna (not shown) that couples the optical spectrum to an optical fiber. The optical fiber then conducts the optical spectrum to other devices such as the optical receiver 20.

Figure 4:
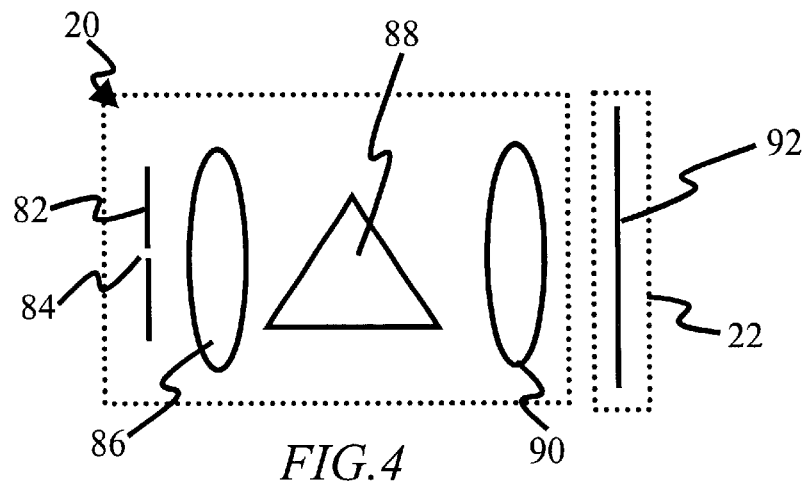
FIG. 4 illustrates an exemplary schematic layout of another part of the optical communication system of FIG. 1.

Referring now to FIG. 4, an exemplary schematic layout of the optical receiver 20 and the demodulation section 22 is illustrated. The optical receiver 20 comprises a receiving slot mount 82 with a slot 84 and a receiver objective lens 86, optically coupled to the slot 84, to align light rays of the optical spectrum in parallel relative to each other. Thereafter, parallel optical frequencies of the optical spectrum from the receiver objective lens 86 are diffracted by a prism 88 of the disperser 80. As in the modulation section 14, the prism 88 may be replaced with an optical grating to diffract the optical spectrum.

Output from the prism 88 is then directed by a receiver spectral lens 90 of the optical receiver 20 towards the demodulation section 22. The demodulation section 22 comprises at least one optical demodulator 92 that is optically coupled to the optical receiver 20 and arranged in association with the modulated optical frequencies of the optical spectrum. The optical demodulator 92 can comprise, for example, optical amplitude demodulators or optical detectors centred at a plurality of predetermined optical frequencies of the modulated optical frequencies. As such, an optical amplitude demodulator or an optical detector is triggered when an optical frequency is detected at a position corresponding to one of the plurality of predetermined optical frequencies.

Detection of the modulated optical frequencies enables decoding of the optical spectrum based on Table 3 above. Hence, for modulated optical frequencies that are detected, a bit '1' is registered and for modulated optical frequencies that are not detected, a bit '0' is registered. Spectrally, a bit '0' shows as a black band at the position of a modulated optical frequency that was blocked off by a closed optical switch 70 of the optical modulator 58 of the modulation section 14. Otherwise, for a predetermined optical frequency that has passed through an open optical switch 70, that predetermined optical frequency of the optical spectrum is visible.

It is to be noted that the elements of the system 10 are provided as illustrative examples only. Accordingly, these elements or other elements can be modified in various ways to enable parallel modulation or parallel demodulation of the optical spectrum of the invention. However, though details of these various ways or these other elements may not be described, it shall be apparent to one skilled in the art that the invention may be practised without such details.

Figure 5:
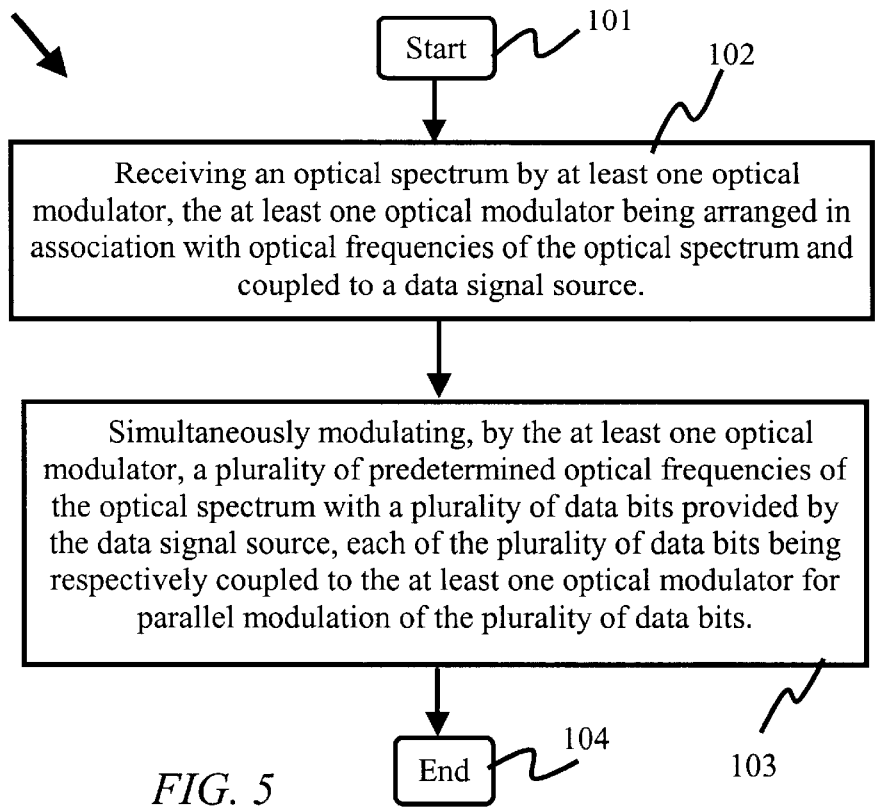
FIG. 5 is a flowchart of a method for parallel modulation of an optical spectrum by the optical communication system of FIG. 1.

A method 100 for parallel modulation of an optical spectrum by the system 10 is illustrated by a flow chart in FIG. 5. Starting at step 101, the method 100 proceeds to step 102 at which the optical spectrum is received by the optical modulator 58. The optical modulator 58 is arranged in association with optical frequencies of the optical spectrum and coupled to the data signal source 16.

Thereafter, the method 100 proceeds to step 103 at which a plurality of predetermined optical frequencies is simultaneously modulated, by the optical modulator 58, with a plurality of data bits provided by the data signal source 16. Each of the plurality of data bits is respectively coupled to the optical modulator 58 for parallel modulation. This modulating step 103 may be amplitude modulating of the plurality of predetermined optical frequencies based upon the plurality of data bits.

It is to be noted that if the optical spectrum is gated, then the optical modulator 58 is synchronised to the predetermined frequency of the gating. Alternatively, if the optical spectrum is provided as pulses, then the modulating step 103 requires the optical modulator 58 to be synchronised in operation with the optical spectrum generator 12. Hence, the spectrum controller 46 controls the optical spectrum or the pulse controller regulates the optical spectrum by controlling, respectively, the predetermined frequency of gating or the predetermined period of each pulse. Accordingly, the gating of the optical spectrum or the timing of the pulses of the optical spectrum is synchronised with the opening or closing of an optical switch 70.

Figure 6:
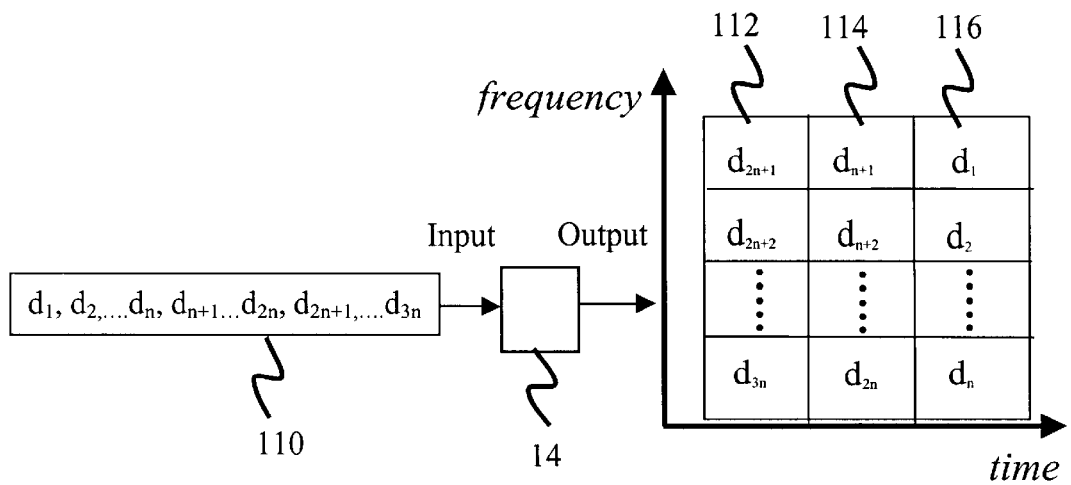
FIG. 6 illustrates input/output relationship of a modulation section of the optical communication system of FIG. 1 based upon the method of FIG. 5.

In the method 100, each of the plurality of data bits is modulated in parallel by the optical modulator 58. FIG. 6 illustrates input/output relationship of the modulation section 14 based upon the method 100. The plurality of data bits 110 is provided from the data signal source 16 as input to the modulation section 14. Although the input is indicated as a serial string of bits, the plurality of data bits 110 can also be provided in parallel (not shown in FIG. 6) as sets of n data bits. Output of the modulation section 14, after modulating the plurality of data bits 110, is shown for three sets of data bits 112,114,116 in a frequency vs. time plot.

The optical spectrum, as modulated optical frequencies, can be optically coupled to the communication section 18 for transmission to the optical receiver 20. The modulated optical frequencies is then received by the optical receiver 20 and demodulated by the demodulation section 22.

Figure 7:
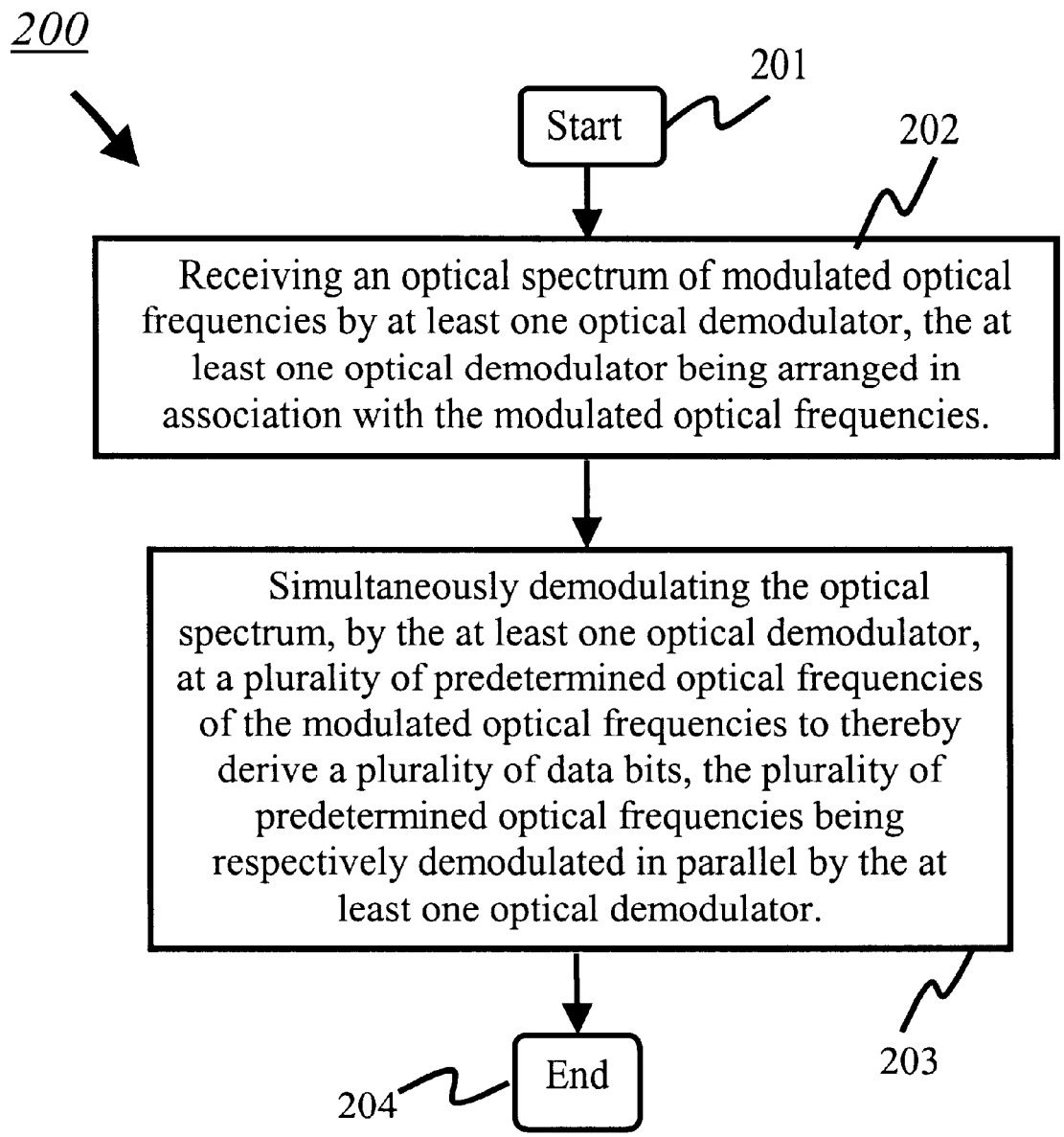
FIG. 7 is a flowchart of a method for parallel demodulation of an optical spectrum of modulated optical frequencies by the optical communication system of FIG. 1.

Referring now to FIG. 7, a flowchart of a method 200 for parallel demodulation of an optical spectrum of modulated optical frequencies by the optical communication system of FIG. 1 is shown. Starting at step 201, the method 200 proceeds to step 202 at which the optical spectrum is received from the optical receiver 20 by the optical demodulator 92 of the demodulation section 22. The optical demodulator 92 is arranged in association with the modulated optical frequencies.

Thereafter, the optical demodulator 92 simultaneously demodulates the optical spectrum at step 203 at a plurality of predetermined optical frequencies of the modulated optical frequencies. The plurality of predetermined optical frequencies is respectively demodulated in parallel by the optical demodulator 92 to thereby derive a plurality of data bits.

It is to be noted that the demodulating step 203 comprises detecting the optical spectrum at the plurality of predetermined optical frequencies. This requires, for example, determining the amplitude of the optical spectrum at each of the plurality of predetermined optical frequencies. Hence, an optical amplitude demodulator or an optical detector of the optical demodulator 92, centred at a position corresponding to one of the predetermined optical frequencies of the modulated optical frequencies, is triggered when a modulated optical frequency is detected at that position.

The method 200 ends at step 204 when the optical spectrum has been demodulated to derive the plurality of data bits modulated on the optical frequencies. The plurality of data bits can then be processed by a device (not shown) operably coupled to the demodulation section 22 to decode the plurality of data bits.

In the foregoing description, an optical communication system 10, a method 100 for parallel modulation of an optical spectrum and a method 200 for parallel demodulation of the optical spectrum of modulated optical frequencies by the optical communication system 10 in accordance with the preferred embodiment of the invention are described. Although only one preferred embodiment is described, it shall be apparent to persons skilled in the art in view of the preferred embodiment that numerous changes and/or modifications can be made to such a preferred embodiment without departing from the scope and spirit of the invention.

What is claimed is:

1. A method for parallel modulation of an optical spectrum, said method comprising:

receiving said optical spectrum by at least one optical modulator, said at least one optical modulator being arranged in association with optical frequencies of said optical spectrum and coupled to at least one data signal source;

simultaneously modulating, by at least one optical modulator, a plurality of predetermined optical frequencies of said optical spectrum with a plurality of data bits provided by said at least one data signal source, each of said plurality of data bits being respectively coupled to said at least one optical modulator for parallel modulation of said plurality of data bits;

synchronizing operation of said at least one optical modulator with a spectrum controller for controlling said optical spectrum; and gating said optical spectrum at a predetermined frequency.

2. A method for parallel modulation of an optical spectrum, said method comprising:

receiving said optical spectrum by at least one optical modulator, said at least one optical modulator being arranged in association with optical frequencies of said optical spectrum and coupled to at least one data signal source;

simultaneously modulating, by at least one optical modulator, a plurality of predetermined optical frequencies of said optical spectrum with a plurality of data bits provided by said at least one data signal source, each of said plurality of data bits being respectively coupled to said at least one optical modulator for parallel modulation of said plurality of data bits;

synchronizing operation of said at least one optical modulator with a spectrum controller for controlling said optical spectrum; and regulating said optical spectrum as pulses, each of said pulses having a predetermined period.

3. An optical communication system for parallel modulation of an optical spectrum, said optical communication system comprising:

means for simultaneously modulating a plurality of predetermined optical frequencies of said spectrum with a plurality of data bits provided by at least one data signal source, said plurality of data bits being coupled to said modulating means for parallel modulation of said plurality of data bits;

wherein said modulating means comprises at least one optical modulator for controlling passage of said plurality of predetermined optical frequencies; and wherein each of said at least one optical modulator comprises an optical switch.

4. An optical communication system for parallel modulation of an optical spectrum, said optical communication system comprising:

means for simultaneously modulating a plurality of predetermined optical frequencies of said spectrum with a plurality of data bits provided by at least one data signal source, said plurality of data bits being coupled to said modulating means for parallel modulation of said plurality of data bits;

wherein said modulating means comprises at least one optical modulator for controlling passage of said plurality of predetermined optical frequencies; and wherein each of said at least one optical modulator comprises an optical shutter.

5. An optical communication system for parallel modulation of an optical spectrum, said optical communication system comprising:

means for simultaneously modulating a plurality of predetermined optical frequencies of said spectrum with a plurality of data bits provided by at least one data signal source, said plurality of data bits being coupled to said modulating means for parallel modulation of said plurality of data bits; and means for synchronizing operation of said modulating means with means for controlling said optical spectrum;

wherein said controlling means comprises means for gating said optical spectrum at a predetermined frequency.

6. An optical communication system for parallel modulation of an optical spectrum, said optical communication system comprising:

means for simultaneously modulating a plurality of predetermined optical frequencies of said spectrum with a plurality of data bits provided by at least one data signal source, said plurality of data bits being coupled to said modulating means for parallel modulation of said plurality of data bits; and means for synchronizing operation of said modulating means with means for controlling said optical spectrum;

wherein said controlling means comprises means for regulating said optical spectrum as pulses, each of said pulses having a predetermined period.

7. A method for parallel amplitude modulation of data bit over the spectrum of a white light or a segment of the white light spectrum, said method comprising the steps of:

receiving the spectrum of a white light or a segment of the white light spectrum by at least one optical modulator, said at least one optical modulator being arranged in association with optical frequencies of the spectrum of a white light or a segment of the white light spectrum and coupled to at least one data signal source;

simultaneously modulating, by said at last one optical modulator, a plurality of predetermined optical frequencies of the spectrum of a white light or a segment of the white light spectrum with a plurality of data bits provided by said at least one data signal source, each of said plurality of data bits being respectively coupled to one optical modulator for parallel amplitude modulation of said plurality of data bits on to the white light or a segment of the white light spectrum;

synchronizing operation of said at least one optical modulator with a spectrum controller for controlling the spectrum of a white light or a segment of the white light spectrum;

gating the spectrum of a white light or a segment of the white light spectrum at a predetermined frequency; and regulating the spectrum of a white light or a segment of the white light spectrum as pulses, each of said pulses having a predetermined period and each pulse of this white light or a segment of the white light carry a plurality of data bits.

8. An optical communication system for parallel amplitude modulation of the spectrum of a white light or a segment of the white light spectrum, said optical communication system comprising:

at least one optical modulator for simultaneously modulating a plurality of predetermined optical frequencies of said spectrum with a plurality of data bits provided by at least one data signal source, said plurality of data bits being coupled to each of said at least one optical modulator for parallel amplitude modulation of said plurality of data bits, and each of said at least one optical modulator includes an optical switch.

9. The optical communication system as claimed in claim 8, wherein each of said at least one optical modulator includes an optical shutter for gating.

10. The optical communication system as claimed in claim 8, further comprises a means for synchronizing operation of at least one optical modulator with means for controlling the spectrum of a white light.

11. The optical communication system as claimed in claim 10, wherein said controlling means comprises means for gating the spectrum of a white light at a predetermined frequency.

12. The optical communication system as claimed claim 10, wherein said controlling means comprises means for regulating the spectrum of a white light or a segment of the white light spectrum as pulses, each of said pulses having a predetermined period and carry a plurality of data bits.

* * * * *